(12) United States Patent
Jones et al.

(10) Patent No.: US 11,135,632 B2
(45) Date of Patent: Oct. 5, 2021

(54) LARGE SCALE METAL FORMING CONTROL SYSTEM AND METHOD

(71) Applicant: ILLINOIS TOOL WORKS INC., Glenview, IL (US)

(72) Inventors: Jerald Edward Jones, Golden, CO (US); Valerie Lisa Rhoades, Golden, CO (US); Adam N. Cuneo, Golden, CO (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 79 days.

(21) Appl. No.: 16/139,593

(22) Filed: Sep. 24, 2018

(65) Prior Publication Data

US 2019/0022726 A1    Jan. 24, 2019

Related U.S. Application Data

(63) Continuation of application No. 14/705,738, filed on May 6, 2015, now Pat. No. 10,112,227, which is a
(Continued)

(51) Int. Cl.
*H05B 6/10* (2006.01)
*B21D 5/00* (2006.01)
(Continued)

(52) U.S. Cl.
CPC ............. *B21D 5/008* (2013.01); *B21D 5/004* (2013.01); *B21D 5/02* (2013.01); *B21D 11/20* (2013.01);
(Continued)

(58) Field of Classification Search
CPC ........ B21D 37/16; B21D 11/20; B21D 5/004; B21D 5/008; B21D 5/01; B21D 5/02;
(Continued)

(56) References Cited

U.S. PATENT DOCUMENTS

| 3,614,811 | A |   | 10/1971 | Johnson |         |
|-----------|---|---|---------|---------|---------|
| 4,120,187 | A | * | 10/1978 | Mullen  | C21D 9/46 |
|           |   |   |         |         | 72/342.6 |

(Continued)

FOREIGN PATENT DOCUMENTS

| CN | 101332478 | 12/2008 |
| CN | 102933330 | 2/2013  |

(Continued)

OTHER PUBLICATIONS

Masubuchi, K, Jones J.E., "Laser Forming for Flexible Fabrication," Journal of Ship Production, vol. 16, No. 2, May 2000, pp. 97-109.

(Continued)

Primary Examiner — Hung D Nguyen
(74) Attorney, Agent, or Firm — McAndrews, Held & Malloy, Ltd.

(57) ABSTRACT

In certain embodiments described herein, a heated line forming system includes a heating coil system configured to produce a heated line on a surface of a metal part. The heated line forming system also includes an air knife cooling system configured to maintain a dry area for the heated line, and to direct a coolant (e.g., cooling water, liquified gases such as liquid argon, solidified gases such as carbon dioxide snow, and so forth) around the heated line via a spray mechanism such that the coolant does not flow or splash into the heated line on the metal part. In certain embodiments, the heated line forming system includes multiple induction coils arranged along a line and spaced a short distance apart, but which, when operated simultaneously together, form a heated line on a surface of a metal part.

20 Claims, 8 Drawing Sheets

Related U.S. Application Data continuation-in-part of application No. 14/532,695, filed on Nov. 4, 2014, now Pat. No. 10,231,289.

(60) Provisional application No. 61/901,294, filed on Nov. 7, 2013.

(51) Int. Cl.
| | |
|---|---|
| *B21D 37/16* | (2006.01) |
| *B21D 5/02* | (2006.01) |
| *H05B 6/42* | (2006.01) |
| *H05B 6/44* | (2006.01) |
| *B21D 11/20* | (2006.01) |
| *C21D 1/42* | (2006.01) |
| *C21D 7/13* | (2006.01) |
| *C21D 9/46* | (2006.01) |
| *C21D 1/667* | (2006.01) |
| *C21D 1/52* | (2006.01) |

(52) U.S. Cl.
CPC .......... *B21D 37/16* (2013.01); *H05B 6/103* (2013.01); *H05B 6/42* (2013.01); *H05B 6/44* (2013.01); *C21D 1/42* (2013.01); *C21D 1/52* (2013.01); *C21D 1/667* (2013.01); *C21D 7/13* (2013.01); *C21D 9/46* (2013.01); *C21D 2261/00* (2013.01); *Y02P 10/25* (2015.11)

(58) Field of Classification Search
CPC .......... B21D 5/0281; C21D 7/13; C21D 1/42; C21D 1/52; C21D 1/667; C21D 9/46; C21D 2261/00; Y02P 10/253; Y02P 10/25; H05B 6/06; H05B 6/42; H05B 6/44; H05B 6/101; H05B 6/103; H05B 6/105
USPC ....... 219/602–614, 632, 635, 639, 645, 646, 219/647, 662
See application file for complete search history.

(56) References Cited

U.S. PATENT DOCUMENTS

| | | | |
|---|---|---|---|
| 4,554,029 A | 11/1985 | Schoen | |
| 5,228,324 A | 7/1993 | Frackiewicz | |
| 5,719,374 A * | 2/1998 | Frackiewicz | B21D 5/00 |
| | | | 219/121.66 |
| 6,002,118 A | 12/1999 | Kawano | |
| 6,043,471 A | 3/2000 | Wiseman | |
| 6,251,328 B1 | 6/2001 | Beyer | |
| 6,298,310 B1 | 10/2001 | Kawano | |
| 6,334,350 B1 | 1/2002 | Shin | |
| 6,385,556 B1 | 5/2002 | Kawano | |
| 6,456,957 B1 | 9/2002 | Kawano | |
| 6,560,498 B1 | 5/2003 | Shin | |
| 6,622,540 B2 | 9/2003 | Jones | |
| 6,813,923 B2 | 11/2004 | Jones | |
| 6,940,056 B2 | 9/2005 | Christofis | |
| 8,480,823 B1 * | 7/2013 | Matsen | B21D 37/16 |
| | | | 148/574 |
| 2004/0237622 A1 | 12/2004 | Myhr | |
| 2005/0035115 A1 | 2/2005 | Anderson | |
| 2006/0117826 A1 | 6/2006 | Hellgren | |
| 2006/0157168 A1 | 7/2006 | Nakamura | |
| 2012/0067100 A1 * | 3/2012 | Stefansson | C21D 7/13 |
| | | | 72/342.1 |
| 2015/0122801 A1 | 5/2015 | Jones | |

FOREIGN PATENT DOCUMENTS

| | | |
|---|---|---|
| JP | H1190538 | 4/1999 |
| JP | 2012051022 | 3/2012 |
| JP | 2012066273 | 4/2012 |
| JP | 2014083544 | 5/2014 |
| KR | 19990074014 | 10/1999 |
| KR | 100319651 | 3/2002 |
| KR | 20050087765 | 8/2005 |
| KR | 20100037483 | 4/2010 |

OTHER PUBLICATIONS

"Metal Plate Forming," Department of the Navy SBIR/STTR Success Stories, Office of Naval Research, Sep. 2004, p. 18.

International Search Report for PCT application No. PCT/US2014/064078, dated Jan. 19, 2015, 10 pgs.

International Search Report for PCT application No. PCT/US2016/022068, dated Jun. 8, 2016, 12 pgs.

Madden, S., H.H. Vanderveldt, J. Jones, "Intelligent Automated Welding for Shipyard Applications," The Society of Naval Architects and Marine Engineers, Ship Production Symposium, Sep. 3-6, 1991.

Subramaniam, S., D.R. White, J.E. Jones, and D.W. Lyons, "Experimental Approach to Selection of Pulsing Parameters in Pulsed GMAW: A method for selection of process parameters in pulsed GMAW helps to efficiently develop welding procedures," Welding Research Supplement, May 1999, pp. 166-s-172-s.

Turner, G.E., Jones, J.E., Rhoades, V. L., et al., "Portable Automated Plate Straightener (PAPS): Flexible Automation for Ship Production—Integration into the Shipyard," Society of Naval Architects and Marine Engineers, Annual Meeting, Jan. 1, 2006.

Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.

Jones, J.E., Turner, G.E., Rhoades, V.L., et al., "Weld Distortion Mitigation by Automated Thermal Forming," Fabtech International & AWS Welding Show, American Welding Society, Chicago, IL, Nov. 11-14, 2007.

Korean Office Action Appln No. 10-2016-7010898 dated Sep. 10, 2020.

* cited by examiner

FIG. 2A
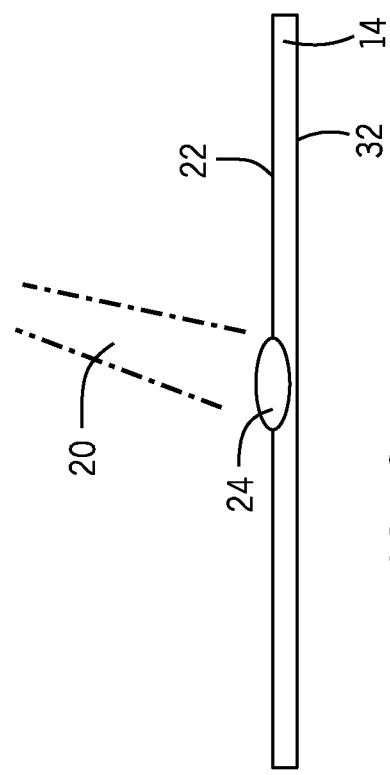
FIG. 2B
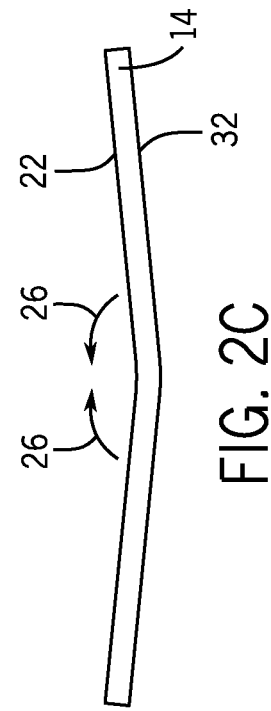
FIG. 2C
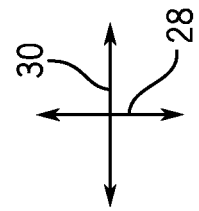

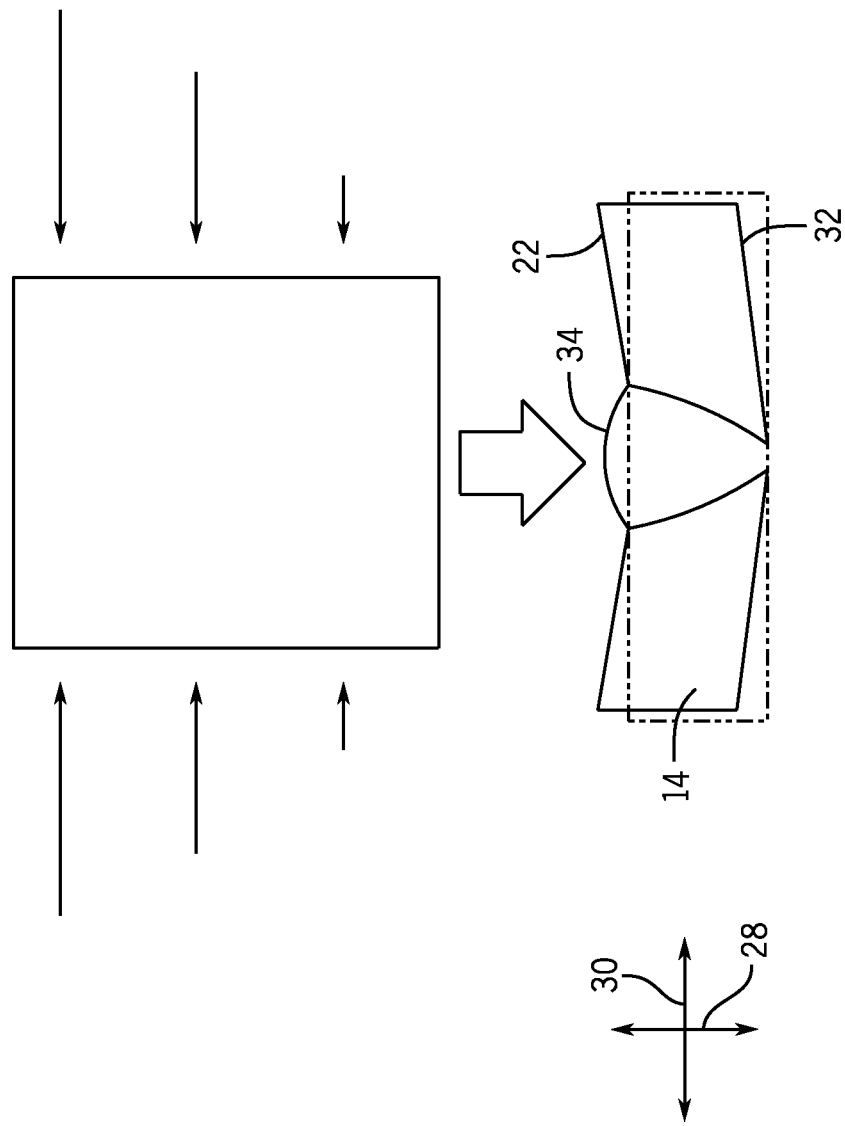

LARGE SCALE METAL FORMING CONTROL SYSTEM AND METHOD

CROSS-REFERENCE TO RELATED APPLICATIONS

This application is a continuation of co-pending U.S. patent application Ser. No. 14/705,738 having a filing date of May 6, 2015, which is a Continuation-In-Part Patent Application of U.S. Non-Provisional patent application Ser. No. 14/532,695, entitled LARGE SCALE METAL FORMING," filed Nov. 4, 2014, which claims priority from and the benefit of U.S. Provisional Patent Application No. 61/901, 294, entitled "LARGE SCALE METAL FORMING," filed Nov. 7, 2013, all of which are hereby incorporated by reference in their entireties for all purposes.

BACKGROUND

The invention relates generally to metal forming, and more particularly, to automated thermal forming processes and systems.

Steel and, to a lesser extent, aluminum are the structural materials of choice for most fabricating, although it will be appreciated that other types of metals are often used in fabrication as well. Consequently, metal bending and metal forming operations will continue to be of significant importance to fabricators. As quality and productivity requirements increase, automated systems will be required to meet those demands. Today, the fabricating industry depends on manual processes, such as line heating, spot heating, mechanical bending, press brakes, and manually operated equipment for most metal forming operations. One major fabricating industry is the shipbuilding industry; consequently, shipbuilding examples are included in this description. However, other fabricating industries will benefit from the automated thermal forming processes and systems described herein.

BRIEF DESCRIPTION

In general, two methods are used in forming large metal plate pieces: hot forming and cold forming. Mechanical cold forming is generally accomplished using a linear press or a roller, and is mainly used as a method to form simple curved plates or non-complex three dimensional shaped plates or to produce plates with constant curvature as a preceding method for forming plates where there is curvature in both the x and y perpendicular axes in the plane of the originally flat plate surface. These doubly curved plates generally use hot forming. Hot forming can be accomplished using a press to apply force on a uniformly heated plate. Another hot forming method, which may be referred to as thermal forming or line heating, uses residual thermal elastic-plastic deformation, which is created by differential or local heating and cooling, but where no externally applied force is used. This line heating or thermal forming may be used to form doubly curved plates or as a method to remove residual welding deformation in ship blocks.

The hot forming method may be referred to as a line heating process since plates are heated by moving a single heat source in a constant direction along a line, or a virtual line, on the plate surface. A large flat metal plate may be formed to have a three-dimensional shape of compound curvature by locally heating a spot to an elevated temperature that is then moved along predetermined lines and then quickly cooling. The heating may or may not extend completely through the thickness of the plate. The use of through thickness heating and then cooling may cause significant shrinkage in-plate, a significant portion of which is in a direction perpendicular to the line of heating being traversed by the heat source or heated spot. Heating may be carried out along lines in a geometric pattern and in a preselected sequence such that the plate has a gradual transformation to a new shape. The plate can be supported upon an underlying cradle, or a series of pin-jigs, which may be in the shape of the finished plate, or adjusted during the forming process.

In certain embodiments described herein, a heated line forming system includes a heating coil system configured to produce a heated line on a surface of a metal part. The heated line forming system also includes an air knife cooling system configured to maintain a dry area for the heated line, and to direct a coolant (e.g., cooling water, liquified gases such as liquid argon, solidified gases such as carbon dioxide snow, and so forth) around the heated line via a spray mechanism such that the coolant does not flow or splash into the heated line on the metal part until the heating activity is finished and the heated line moves. In certain embodiments, the heated line forming system includes multiple induction coils arranged along a line and spaced a short distance apart, but which, when operated simultaneously together, form a heated line on a surface of a metal part.

DRAWINGS

These and other features, aspects, and advantages of the present invention will become better understood when the following detailed description is read with reference to the accompanying drawings in which like characters represent like parts throughout the drawings, wherein:

FIGS. 2A through 2C illustrate multiple steps in an exemplary thermal forming process in accordance with embodiments of the present disclosure;

FIG. 3 is a diagram of angular distortion in butt welds in accordance with embodiments of the present disclosure;

Figure 9:
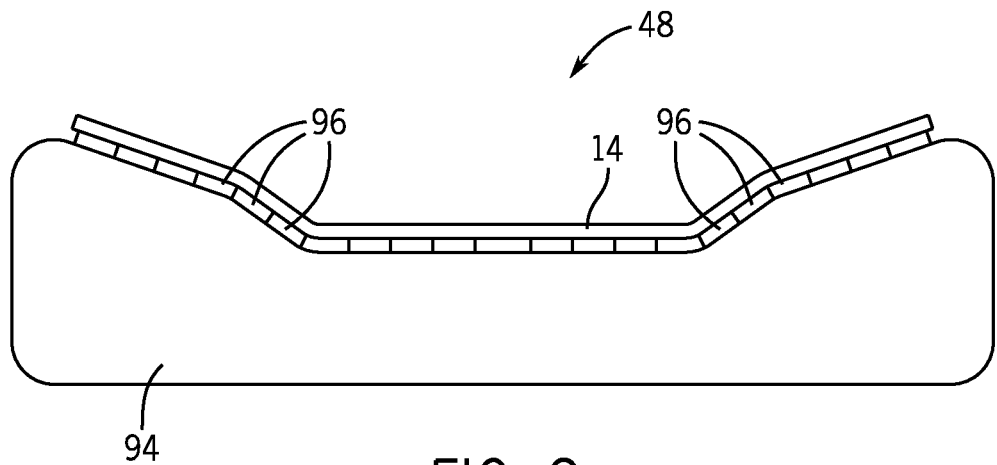
Figure 10:
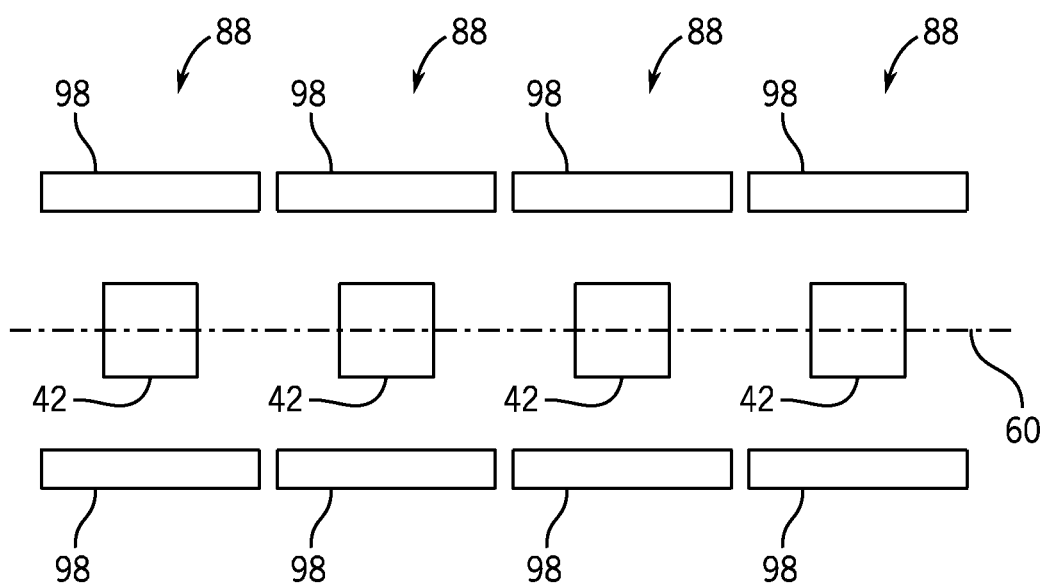

FIG. 9 is a side view of an exemplary heating bed comprising a deformable liquid-filled bladder upon which plates may be supported during a thermal forming process in accordance with embodiments of the present disclosure; and FIG. 10 is a cutaway top view of exemplary thermal forming assemblies having air guides with opposite parallel walls disposed on opposite sides of a heating head in accordance with embodiments of the present disclosure.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including." and "having" are intended to be inclusive and mean that there may be additional elements other than the listed elements.

Figure 1:
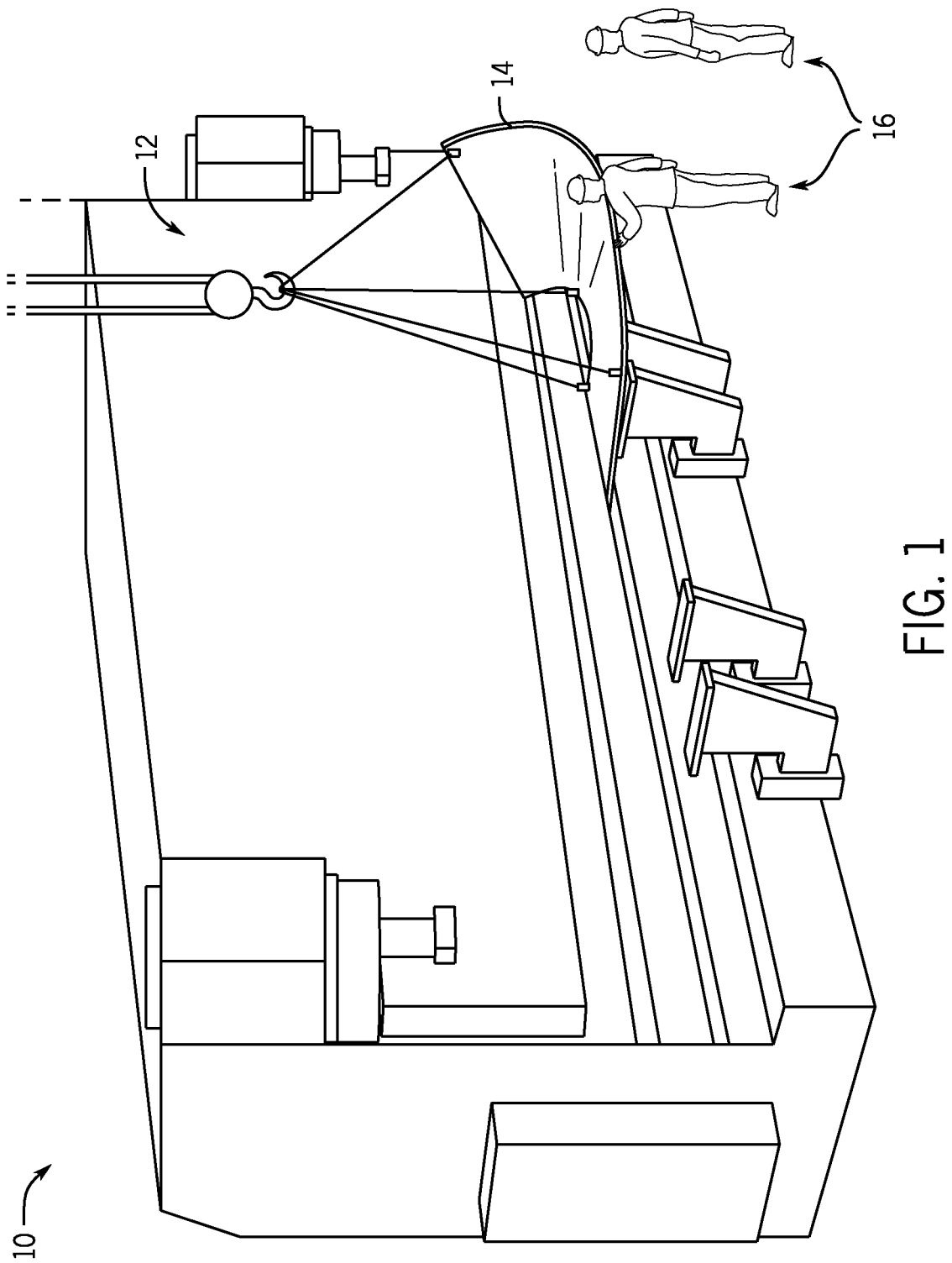
FIG. 1 illustrates a typical linear press brake that may be used with conventional metal forming processes.

The cost of using the manual and manually operated metal forming processes discussed above may be significant. FIG. 1 illustrates a typical linear press brake 10 (e.g., a 40 foot wide, 2,500 ton press brake) that may be used with conventional metal forming processes. The press brake 10 can make a bend relatively quickly, but for any significant size part, the system requires a crane 12 to lift the sheet material 14 and as many as five crane and machine personnel 16 working for several minutes before the bend can be produced. Sometimes, the crane 12 may be replaced with a semi-automated plate moving system (which can be relatively expensive). In order to maintain reasonable salary levels for shipyard employees and still compete on an international level, metal forming in the shipyard may benefit from more automated methods.

The existing manual workforce in the fabricating industry has largely been replaced with workers that oversee and maintain computerized monitoring systems and control systems, and many of the processes that were once used, are no longer being applied. For example, two decades ago, most holes were drilled using rotating drills. Today, in automated factories, holes are drilled with lasers.

One reason why fabricating has been unable to implement automation in the Unites States and Europe is the general nature of fabricating. Mass produced ships, produced elsewhere, such as in Asia, are highly automated, but those shipbuilders depend on careful robot programming for much of their process control and quality monitoring. This is also true of the automobile industry, particularly in the United States and elsewhere. The commonality is production of large quantities of identical components. Shipbuilding in the United States and, to an extent, in Europe, has a large component of one-off and few-of-a-kind production. In these environments, robot programming and re-programming for many different kinds of parts can be prohibitively expensive, for example, up to or in excess of billions of dollars for some automobile plants.

In order for fully automated metal forming to be economically viable, it would be advantageous to utilize flexible automation in the one-off and few-of-a-kind manufacturing environment of shipbuilding. Flexible automation is generally based on the ability to accomplish three tasks automatically: 1) program robot motion and process control directly from information contained in computer-aided design (CAD) models; 2) have new metal forming processes that are capable of flexible automation; and 3) monitor for quality assurance, and control processes—all in real-time.

Thermal forming of metals is generally a process of creating residual strain in a metal part by differential heating and cooling. This process, as used today in shipyards, is called "line heating," which is primarily done manually by relatively highly skilled individuals. The embodiments described herein are directed toward automated thermal forming processes and systems that are relatively fast, and can produce thermally formed parts with greater accuracy than line heating and conventional metal forming operations, such as the linear brake press 10 illustrated in FIG. 1.

FIGS. 2A through 2C illustrate multiple steps in an exemplary thermal forming process 18 in accordance with embodiments of the present disclosure. The illustrated thermal forming process 18 includes two primary steps, heating and cooling, that form the metal without requiring externally applied forces. As illustrated in FIG. 2A, the process 18 may begin with undeformed sheet material 14. Then, as illustrated in FIG. 2B, heating may be applied to the sheet material 14, for example, by moving a heat source 20 (e.g., a flame, a laser beam, an induction heating coil, and so forth) across a first surface 22 of the sheet material 14. The temperature of the metal of the sheet material 14 at the heated region 24 is increased sufficiently such that sufficient thermal expansion causes plastic deformation to result. It is noted that the heated region 24 on the first surface 22 does not expand to the sides. Rather, it is constrained by the relatively cold surrounding material, so that it expands away from the first surface 22, permanently deforming—getting thicker. As illustrated in FIG. 2C, once the sheet material 14 cools, the heated/deformed region 24 shrinks, as illustrated by arrows 26, pulling on the first surface 22 of the sheet material 14. The heated region 24 of the sheet material 14 is cooled back to ambient temperature, which causes thermal shrinking that results in shrinkage stresses, that are sufficient to generate strain and cause bending (e.g., deformation) in the sheet material 14. In certain embodiments, this process may be repeated by scanning the heat source 20 across the first surface 22 of the sheet material 14, pipe material, I-beam material, L-shaped material, bar stock, conical, circular, trapezoid, square, polygon, or other initial shape, in a predefined pattern to create desired shape.

The theory of the thermal forming process is that the heating operation has to produce thermal expansion, and permanent strain, in the through-thickness direction 28 (i.e., a direction generally perpendicular to the first surface 22 of the sheet material 14). The cooling operation needs to produce thermal shrinkage and permanent strain in the two-dimensional plane 30 that is perpendicular to the through-thickness direction 28 (i.e., the two-dimensional plane generally parallel to the first surface 22 of the sheet material 14). It is this asymmetry of plastic deformation due to thermal expansion and shrinkage that causes the metal to bend.

In general, relatively quick heating of the sheet material 14 is advantageous insofar as thermal expansion of the heated metal benefits from being constrained to be only in the through-thickness direction 28. As such, the heating should be done fast enough to get a significant amount of the metal heated, but only heated about halfway through the thickness of the sheet material 14, as illustrated in FIG. 2B. This facilitates the thermal expansion occurring primarily in the through-thickness direction 28 because the heat has not spread to the surrounding material, if it is heated quickly. The yield strength of the hot metal is relatively low so that it easily deforms, constrained by the higher yield strength cold metal. However, the thermal shrinkage that occurs will, to some extent, be in the plane 30 that is parallel to the metal surface 22, and primarily concentrated near one surface (e.g., the first surface 22 in the embodiment illustrated in FIG. 2C). The previously heated metal cools and the yield strength increases, consequently this metal will exert a significant load on the surrounding metal and cause the metal part to bend.

As such, for the cooling operation, the primary thermal shrinkage is generally in the plane 30 perpendicular to the through-thickness direction 28, and concentrated close to one of the first surface 22 or the second surface 32 of the sheet material 14 (e.g., again, the first surface 22 in the embodiment illustrated in FIG. 2C). FIG. 3 is a diagram of angular distortion in butt welds in accordance with embodiments of the present disclosure. The thermal forming process generates bending of the metal in welds, such as the butt weld 34 illustrated in FIG. 3, much the same way as the solid sheet material 14 of FIGS. 2A through 2C. If the primary thermal shrinkage is in the plane 30 perpendicular to the through-thickness direction 28, and the sheet material 14 is hotter on one surface 22, 32 than the other surface 22, 32, then bending will occur. In general, the bending will be toward the hottest surface 22, 32.

Precise control of the heating for the thermal forming process described herein facilitates proper metal forming. In general, if the heat is not properly controlled, then the process will not lead to desired metal forming. There are several considerations with respect to such heat control. First, the heated material 14 should be constrained by a surrounding "container" of cold metal. In general, the heat should be constrained to only the material closest to the surface which is being heated (e.g., the first surface 22 in the embodiment illustrated in FIG. 2B) so that the maximum shrinkage will occur concentrated at or near that surface. Also, in general, the surface of the material on the other side of the plane 30 perpendicular to the through-thickness direction 28 (e.g., the second surface 32 in the embodiment illustrated in FIG. 2B) and mid-way through the thickness of the metal does not receive any significant heating. Since heat flow (i.e., conduction) to the non-heated side of the metal is time-dependent, this means that the heat should be applied at the fastest possible rate, to maximize the thermal gradient in the through-thickness direction 28 at the time when the heating is stopped and cooling begins. In general, thermal expansion in the plane that is perpendicular to the through-thickness direction 28 will be counterproductive to obtaining the maximum efficiency of the metal forming process. As such, the surrounding material may be kept relatively as cold as possible to constrain the heated material. This generally insures that the primary thermal expansion will be in the through-thickness direction 28. Otherwise, the net amount of thermal contraction that causes the bending will be reduced by the amount of thermal expansion that is not in the through-thickness direction 28.

Flame heating is the primary method applied in most shipyards. Laser heating is another potential heat source 20 for thermal forming, but neither flame or laser heating is ideal for use on thicker metal. Flame heating has the drawback that most of the heat that is produced by the combustion process is lost to the surrounding environment (e.g., as much as 30%-50% of the flame heat may be lost). In addition, heat that is externally generated must pass through the interface at the surface of the metal, which is an additional inefficiency, both of flame heating, as well as laser heating. Moreover, the heating efficiency of a laser can be even less efficient than a flame. First, lasers typically operate at an efficiency of 3% to 30%. So, even for an efficient laser, 70% of the energy may be lost as waste heat. In addition, an associated refrigeration system that removes the waste heat uses energy as well. Then, before the heat can pass through the interface of the metal surface, the laser must couple with the surface to transfer the energy of the laser light beam. As such, although flame heating and laser heating may definitely be used with the thermal forming embodiments described herein, for both flame and laser, the energy efficiency may be below 30%.

Consequently, meeting the first objective of the thermal forming system, to heat as quickly as possible, while both flame and laser heating can be used, they can be far from optimum. To heat as quickly as possible, the system should be able to put the maximum amount of heat into the interior of the heated material 14 in the shortest amount of time. In certain embodiments, induction heating may be used to generate induced electric current directly in the part, near the surface closest to an induction coil. Heating may be accomplished by high frequency "eddy" currents being conducted in the interior bulk of the material 14, driven by a high-frequency electromagnetic field created by the induction coil. In general, induction heating may be the fastest and most efficient heating method for use with the embodiments described herein. Examples of induction heating systems that may be utilized in the embodiments described herein are disclosed, for example, in U.S. Patent Application Publication No. 2011/0284527, entitled "Auxiliary welding heating system", filed May 19, 2011, which is incorporated by reference herein.

The calculation of time to reach forming temperature depends on the heat flux of the chosen process. In certain situations, for example, the maximum allowable temperature for thermal forming for EH-36 marine steel is approximately 1150° F. The following equation can be used to calculate the relative time required to reach the forming temperature.

$$t_{ig} \propto \left[\frac{T_{ig} - T_o}{q''}\right]^2$$

$t_{ig}$ = Time to reach forming temperature, $T_{ig}$ = Forming Temperature(° K), = 1150

$T_0$ = Ambient Temperature (° K), = 370

$q''$ = Heat flux(W/m$^2$)

= 48,880,000(acetylene)

= 1,400,000,000 (35 kW induction)

Because of the variability of heat generation efficiency, and the thermal barrier of the metal surface, only an approximation of the relative time may be reached. However, as but one example, experimental data comparing a number 4 Oxy-acetylene torch tip to a 35 kW induction heating head shows that the ratio of the heating time is approximately 20:1.

$t_{ig}$=20 sec.(acetylene)

$t_{ig}$<1 sec.(35 kW induction)

Figure 4A:
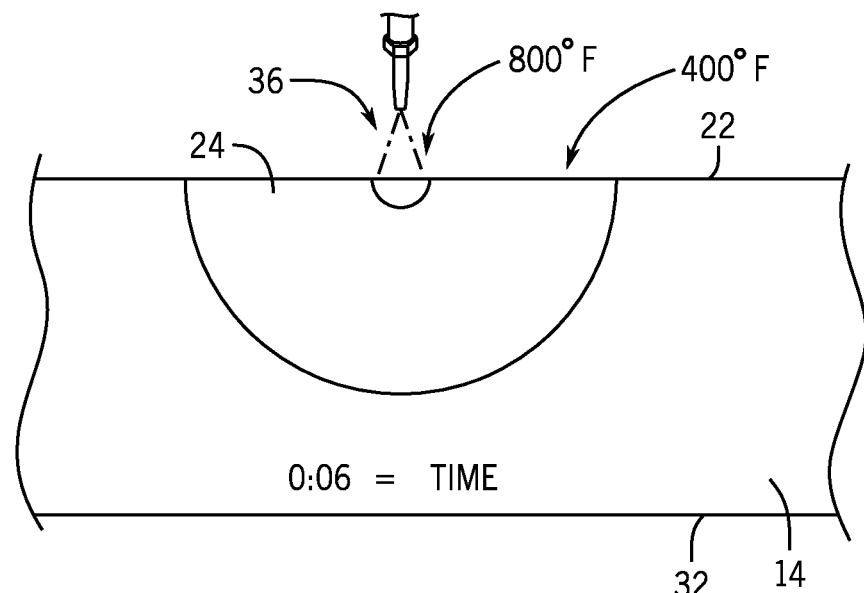
FIGS. 4A and 4B illustrate the time and temperature differences of oxy-acetylene heating versus induction heating, respectively.
Figure 4B:
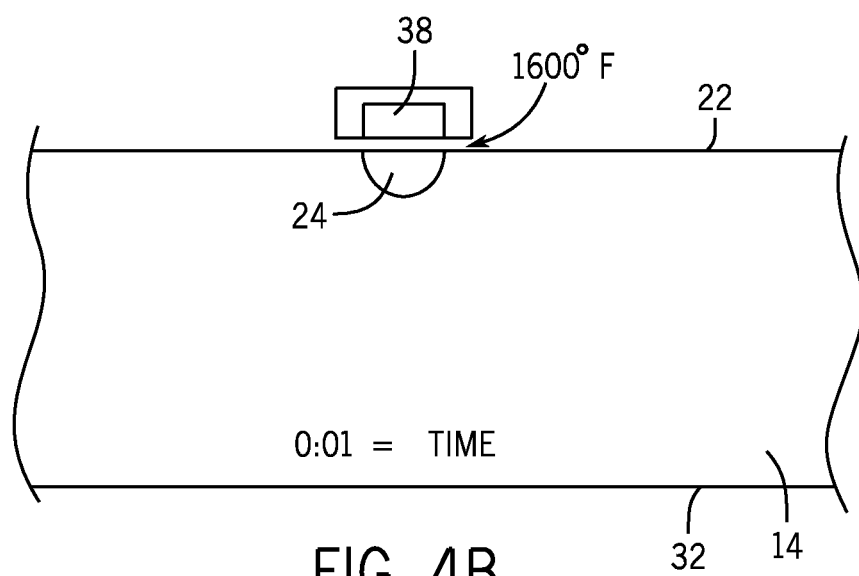

FIGS. 4A and 4B illustrate the time and temperature differences of oxy-acetylene heating versus induction heating (e.g., with a 35 kW induction heating system), respectively. After approximately six seconds, the heated region 24 of the flame 36 has extended well beyond the half thickness point of the material 14 and is spreading well beyond the width of the required heated spot size, yet the maximum temperature at the first surface 22 is still only 800° F. In contrast, the temperature of the heated surface 22 after only approximately one second with induction heating has exceeded the 1150° F. thermal forming temperature. Therefore, the induction controller needs to only heat approximately 850 ms. at full power, to achieve the desired forming temperature. By adjusting the power level and coil size, the induction heating system 38 can be "tuned" to produce an ideal heated area size, to optimize the thermal forming process.

Another objective of the thermal forming process described herein is that the material 14 should cool as quickly as possible. Since both laser and flame heating are relatively limited in the amount of heat that they can transfer to the metal, neither of these heating processes are quite as good as induction heating. That is, since heat conduction is time based, the longer the heating time that is needed to reach the maximum temperature, the longer will be the time available for the heat to conduct into the surrounding metal. All of that hot metal surrounding the primary heated area will tend to slow down the cooling rate. In certain embodiments, it may be possible to modify the heating rate for laser heating by increasing the power level of the laser while still maintaining the size of the heated region 24. The drawback is that high power lasers can be prohibitively expensive to purchase and to maintain compared to induction heating.

In certain embodiments, the thermal forming processes described herein may use exclusively induction heating for relatively thicker metal components. Certain embodiments may facilitate portable use, such as deck plate or bulkhead straightening in a shipyard. In such instances, for example, 25 kW portable induction power supplies may be used as the heat source 20. Other embodiments, in particular for forming relatively larger plates, may use one (or multiple) 35 kW induction power supplies as the heat source 20. In yet other embodiments, even higher capacity power supplies and larger induction coils may be used.

It is believed that a flame torch can accomplish 13% as much bending as one induction heating head in a given amount of time. A cost comparison for thermal forming can be calculated assuming that the cost of acetylene is $0.17 per cubic foot, and that the cost of electricity is $0.07 per kW-hr. Given these assumptions, for each $1.00 of operating cost of an induction heating head, to accomplish the same amount of forming with a flame torch costs $157.37. As such, the induction heating embodiments described herein may be considerably less expensive than comparable flame heating embodiments.

Figure 5:
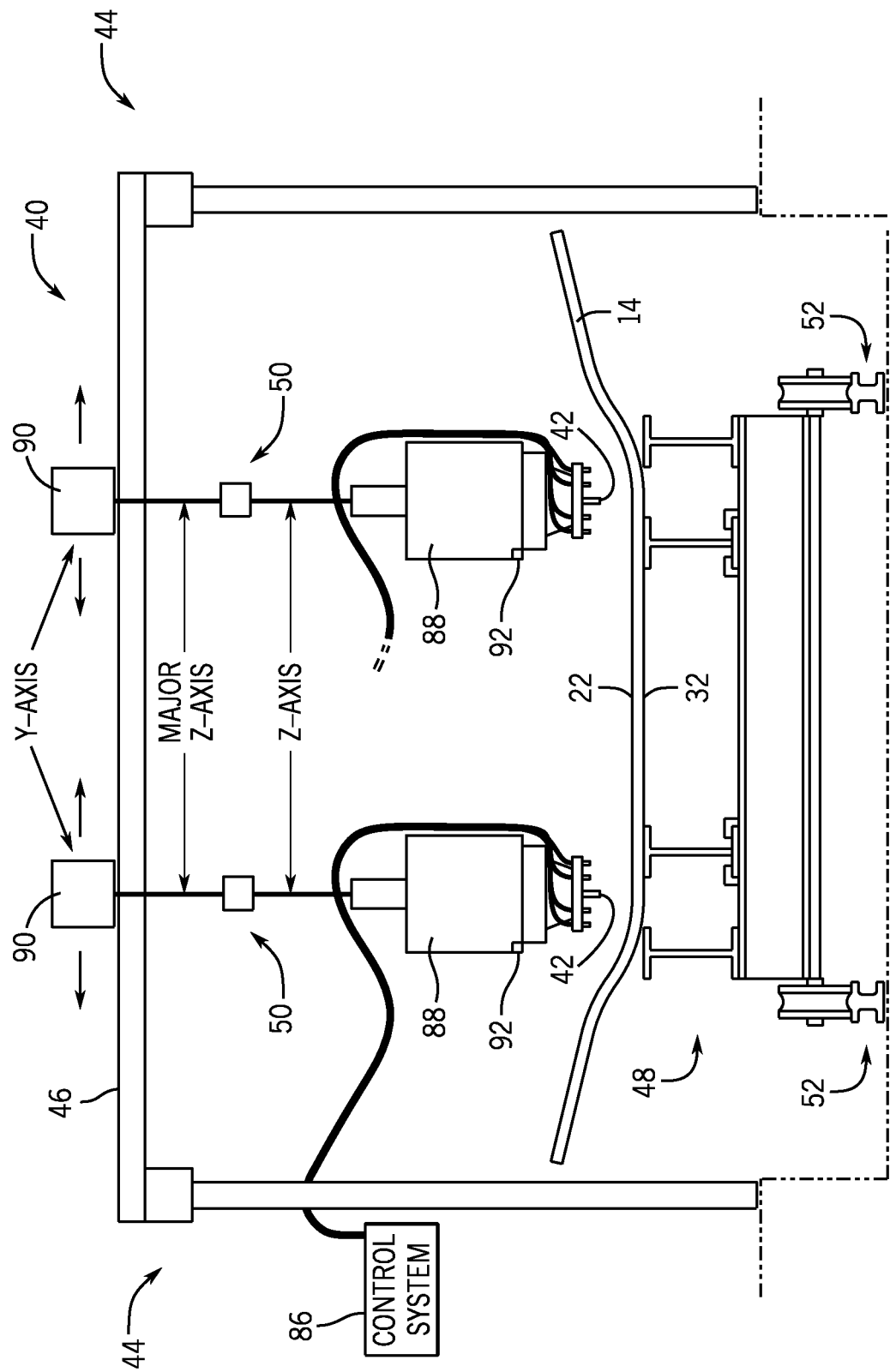
FIG. 5 is a side view of an exemplary automated thermal forming system in accordance with embodiments of the present disclosure.
Figure 6:
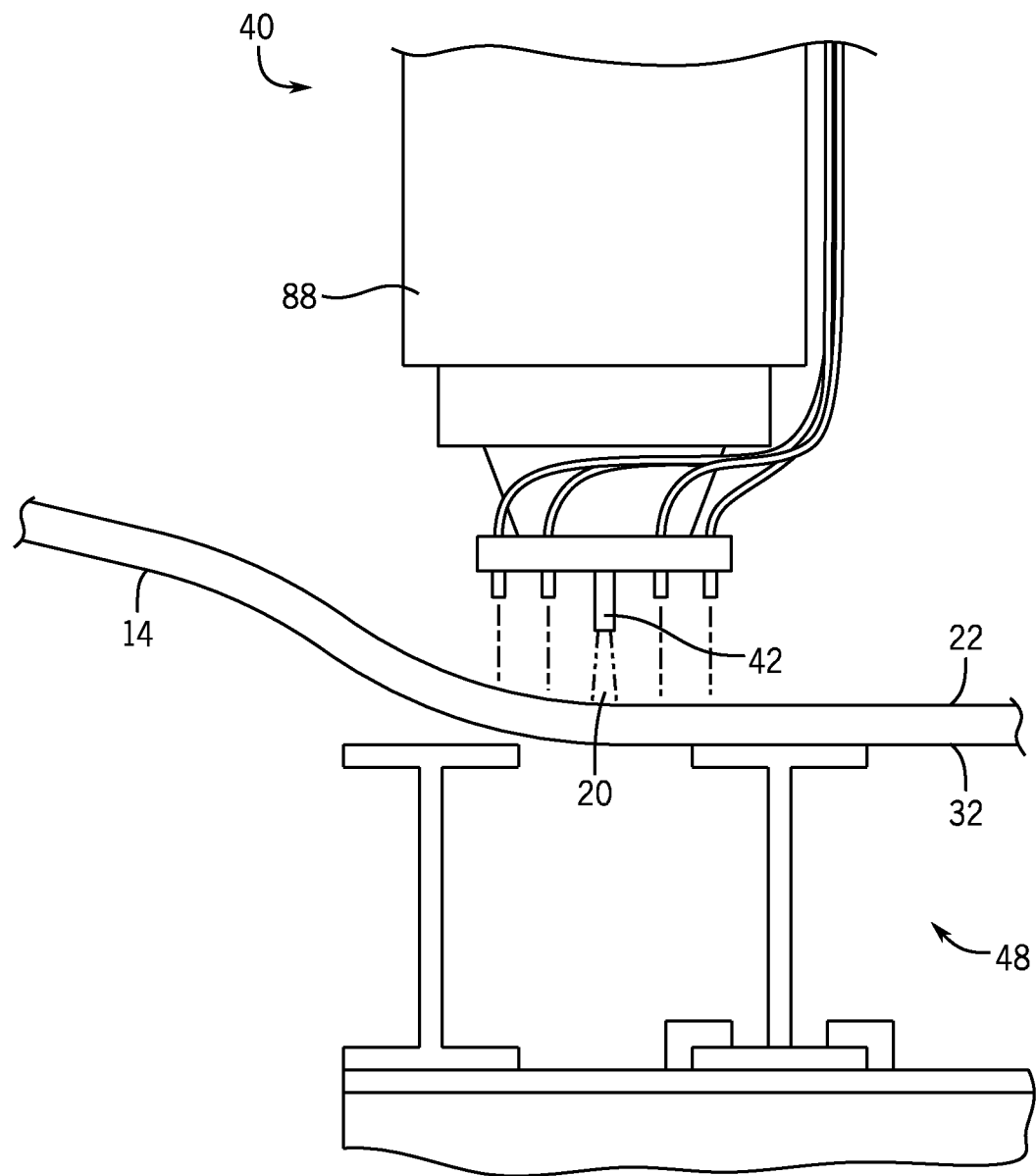
FIG. 6 is another side view showing a relatively complex bend being formed in accordance with embodiments of the present disclosure.

FIG. 5 is a side view of an exemplary automated thermal forming system 40 in accordance with embodiments of the present disclosure. In addition, FIG. 6 is another side view showing a relatively complex bend being formed by the automated thermal forming system 40 in accordance with embodiments of the present disclosure. In certain embodiments, the automated thermal forming system 40 includes a control system 86 capable of 15 degrees of freedom motion control of one or more thermal forming assemblies 88, wherein a position of each thermal forming assembly 88 is independently controllable via positioning devices 90 (e.g., devices that are moveable about a thermal forming station 46, which as illustrated may include a gantry system in certain embodiments) that are attached to respective thermal forming assemblies 88 and that are independently controllable by the control system 86 such that the heated line may be dynamically adjusted during the thermal forming process.

It will be appreciated that, in certain embodiments, the control system 86 includes at least one memory medium that stores computer instructions that may be executed by at least one processor of the control system 86 to generate control signals that may be transmitted to the components of the thermal forming system 40 to effectuate control of operating parameters of the thermal forming system 40. Such control signals may include positioning control signals that are transmitted to the positioning devices 90 for the purpose of controlling the positioning and/or travel speed (in both an x- and y-direction with respect to a surface 22 of the material 14 being thermally formed, as well as a distance (height) of the heating head 42 from the surface 22 of the material 14) of the positioning devices 90 (and, by extension, their respective thermal forming assemblies 88) with respect to the thermal forming station 46, heating control signals that are transmitted to the thermal forming assemblies 88 for the purpose of adjusting the amount of heating applied (and the associated temperature generated) by the thermal forming assemblies 88, air flow and/or pressure control signals for the purpose of adjusting a rate of flow and/or pressure of air through the thermal forming assemblies 88, coolant flow and/or pressure control signals for the purpose of adjusting a rate of flow and/or pressure of coolant through the thermal forming assemblies 88, and so forth. In addition, in certain embodiments, the inductive coupling between the heating head 42 and the material 14 (i.e., how much of the energy delivered through the heating head 42 is being coupled to the material 14) may be monitored (e.g., using measured voltage and current data from the power applied to the respective thermal forming assembly 88) and controlled by the control system 86.

In addition, in certain embodiments, the system 40 may include a plurality of sensors 92 (e.g., up to or exceeding 32 sensors) monitoring air flow and pressure at several locations, coolant flow and temperature at several locations, stand-off of each of the heating heads 42 from the plate surface 22, temperature of the heated regions, sensor error for diagnostics, and so forth, to provide feedback to the control system 86. In certain embodiments, the flexible automation system 40 has two x-axis linear motion components on each 45-foot length side 44 of the forming station 46 and two y-axis linear motion components across a 12-foot width heating bed 48, and six z-axis linear motion components, one for height control of each of the thermal forming assemblies 88 (and, by extension, the heating heads 42 associated with the thermal forming assemblies 88), and two major z-axis linear motion components that move the "head bar" 50 in the vertical direction to lower/raise the (e.g., six, in certain embodiments) heating heads 42. All 12 motion axes are independently controllable for each thermal forming assembly 88, or can in various combinations, be locked under software control to move synchronously. It is noted that the system 40 has the capability to operate up to 80 motion axes with up to 74 thermal forming assemblies 88 (and, by extension, heating heads 42 associated with the thermal forming assemblies 88). In certain embodiments, two-color self-calibrating optical temperature sensors 92 may be used to monitor the temperate of the heated region 24 ten times per second to insure repeatable and predictable final plate shape. The mobile forming bed 48 may be used for rapid insertion and removal of steel plates.

The plate (e.g., material 14) shown in FIG. 5 is resting on the mobile forming bed 48. The mobile forming beds 48 operate on tracks 52—two forming beds alternate, so that a crane can be unloading a finished plate 14 and loading a plate 14 to be formed, while a plate 14 is in the machine being formed. This use of automatic loading enables the machine to maximize throughput. In certain embodiment, the system 40 is configured with six heating heads 42 but, as discussed above, the technology is capable of operating up to 74, or even more, heating heads 42. With the 74 heating heads 42, for this application, a plate 14 can be formed in 15 minutes or even less.

As illustrated in FIG. 5, in certain embodiments, the heating beds 48 may include relatively rigid (i.e., not flexible) surfaces upon which the plate 14 may be supported during the thermal forming process, wherein the rigid surfaces do not conform to the shape (either intermediate shape or final shape) of the plate 14 as it deforms during the thermal forming process. However, in other embodiments, the heating beds 48 may instead include a deformable liquid-filled bladder that supports the plate 14 during the thermal forming process. FIG. 9 is a side view of an exemplary embodiment of a heating bed 48 comprising a deformable liquid-filled bladder 94 upon which plates 14 may be supported during the thermal forming processes described herein. As illustrated, as the plate 14 deforms during the thermal forming process, the liquid-filled bladder 94 conforms to the shape of the plate 14 throughout the thermal forming process. As also illustrated in FIG. 9, in certain embodiments, a layer of segmented components 96 may be disposed on top of the liquid-filled bladder 94 (e.g., between the plate 14 and the liquid-filled bladder 94 during the thermal forming process. In certain embodiments, each segmented component 96 may be attached to adjacent segmented components 96, but be capable of moving slightly with respect to each other such that they collectively conform to the shape of the plate 14 during the thermal forming process. In certain embodiments, the segmented components 96 may be configured to reduce heat transferred to the liquid-filled bladder 94 from the plate 14 being thermally formed. For example, in certain embodiments, the segmented components 96 may be ceramic tiles.

In full production, to maximize the throughput, a crane (e.g., similar to the crane 12 illustrated in FIG. 1) may unload a plate 14 in no more than approximately 7.5 minutes, and then load a new plate 14 in no more than approximately 7.5 minutes on the first mobile forming bed 48. Then, the crane moves to the other end of the machine where the second forming bed 48 will move the currently being formed plate 14. The process of removing a formed plate 14 and placing a plate 14 to be formed is repeated on the second forming bed 48, while the plate 14 on the first forming bed 48 is moved into position and formed. This process repeats so the machine throughput is, for example, up to four formed 10 foot by 40 foot plates 14 per hour.

Returning now to FIG. 5, in certain embodiments, the control system 86 downloads data from a CAD model for each plate 14, automatically plans the forming operation, and starts the forming operation (without operator intervention other than starting and monitoring the system 40, in certain embodiments) all in the time that it takes for the mobile forming bed 48 to move the plate 14 into position. After the forming operation, height sensors on each heating head 42 become measurement sensors. The plate 14 may be scanned and the dimensions recorded for a digital quality control system of the system 40.

Each steel plate 14 that is delivered from any steel mill may vary in dimensions, composition, thermo-mechanical history, and so forth. These variations can cause the steel plate 14 to not react exactly as the process model expects. Consequently, the thermal forming system 40 is capable of identifying any out-of-specification condition from the scanning data taken after forming. This information can be utilized by the planning algorithm to produce a heating plan to bring the plate 14 into conformance with the specification. In certain embodiments, the sensors 92 are capable of 3 mil resolution in surface height measurements, and can detect relatively small variations from the CAD model specification. In certain embodiments, the CAD model data includes tolerance specifications—which the control system 86 will compare to the plate measurements, to determine if remedial forming is required to bring the plate 14 into conformance.

In certain embodiments, if a plate serial number or other identifying information is on the plate 14, the control system 86 can read that information (e.g., using a scanning device) and automatically download the correct CAD model. Thus, the machine operator need only monitor the machine operation and be available to service the machine as may be needed. In certain embodiments, the plates 14 may be stacked in the order in which they are needed. Then, the crane can be automated—loading the mobile forming beds 48, without operator intervention, as well as unloading the plates 14 from the mobile forming beds 48. Thus, it may be possible to only require one operator to monitor the crane and forming system operation. This may reduce the labor cost compared to, for example, a large press brake 10 such as the one discussed above with respect to FIG. 1.

All of the automated processing described above is possible because the heating heads 42 of the present embodiments are independently moveable under control of the control system 86, rather than the plate 14 having to move—as with a linear press brake 10 such as the one discussed above with respect to FIG. 1. Moving the plate 14 in a press brake 10 is relatively slow and cumbersome. In contrast, for the embodiments described herein, once the incoming plate datum points have been identified, the entire forming operation is completely automated and can be performed very rapidly. The heating heads 42 are moved to the locations where forming is performed and, then, automatically moved to the next forming position, based on the CAD model data.

Conventional control systems generally do not have the capabilities needed for simultaneously processing the vast amount of sensor data and then controlling 80 motion axes as described herein. The configuration of the thermal forming system 40 is such that the control system 86 using a processor and software executed by the processor oversee the machine operation and provide a comprehensive operator interface. The control system 86 processes the CAD model data and, in certain embodiments, utilizes an artificial neural network process model to do the planning of the thermal forming. Then, the DSP-based controller receives the heating plan, and executes that plan. In certain embodiments, the control system 86, with the full 74 heating heads 42, may process over 10 megabytes of sensor data per second, in order to monitor the process and the machine health. In certain embodiments, the control system 86 may utilize a modified version of S.H.I.E.L.D., a monitoring system co-developed by EnergynTech, Inc. personnel and Caterpillar Corporation with funding from the National Institute of Standards and Technology—Advanced Technology Program (NIST-ATP). S.H.I.E.L.D. was designed to process data from over 100 sensors (e.g., the sensors 92 described herein) embedded in a large mobile structure, monitor the fatigue damage, and calculate remaining structure life, in substantially real-time. The software developed for S.H.I.E.L.D. by the EnergynTech team, was modified to be able to monitor the large volume of sensor data from the system 40, also in substantially real-time.

One primary drawback is that thermal forming is relatively slow compared to mechanical forming methods except when producing three-dimensional shapes, which are relatively difficult to produce using mechanical bending. In certain embodiments, to increase the speed of the system 40, a heated line may be used, rather than moving a heated spot along a line, to deform the metal. In other words, the thermal forming assemblies 88 may be configured such that a line extending an entire length (or at least a substantial portion of a length) of the plate 14 may be simultaneously heated. In other words, a plurality of thermal forming assemblies 88 may be independently positioned such that the heating heads 42 of the respective thermal forming assemblies 88 constitute the points from which the heated line is formed. This heated line method may result in a significant increase in the speed of thermal forming in an embodiment in which a laser beam is optically converted to a line. Mechanical bending may generally be faster than a line heating method of thermal forming for relatively thick metal parts. There is a need, therefore, for a heated line bending method that has sufficient power to be used on thick metal parts.

The embodiments described herein address these drawbacks by providing a thermal forming method that uses relatively high power induction heating to create an equivalent heated line to be able to produce forming or bending rapidly in relatively thick metal parts. The technique may make use of one or more induction heating power supplies, such as the heat source 20 (e.g., the heating heads 42) of the thermal forming system 40 to produce more power than a typical flame or laser, and that may thus be able to perform the thermal forming process by generating an equivalent of a heated line that will bend or form relatively thick metal much more rapidly. The embodiments described herein also contemplate control of the cooling of the metal part in order to remove the heat rapidly enough so that the significant thermal gradient will exist in the metal part that is required for the thermal forming process.

In contrast to a line heating approach (e.g., FIG. 7A), where a heated spot 54 is moved along a line path 56, as illustrated by arrow 58, and then multiple adjacent line paths 56 are used to produce a bend in the metal part 14, this method (e.g., FIG. 7B) generates a single heated line 60 and the heated line may be moved (e.g., perpendicular to) a direction of the heated line 60, as illustrated by arrow 62, to create a bend in the metal part 14. In certain embodiments, the heated line 60 may be produced by a single heating element, such as an induction coil that has a relatively large power source, or by a series of smaller induction coils arranged in a line or moved along a line which together constitute the equivalent of a heated line 60. A single cooling system or multiple smaller cooling systems may be used to cool the metal part 14 as the heated line 60 is moved across the plate surface.

One disadvantage of the line heating method (e.g., FIG. 7A) is that the heated spot 54 is working to bend the plate 14 at a single location, but the remainder of the metal along the path 56 is not being actively formed or bent and, therefore, becomes an impediment to the forming or bending. By using an entire heated line 60 (e.g., FIG. 7B), all parts of the heated line 60 are being simultaneously formed and a cooperative bending or forming takes place. This results in a significant increase in the rate of forming, which can exceed a factor of 100 fold increase in the rate of forming of a metal part 14, in comparison to conventional methods.

The plan for line heating that is implemented by the control system 86 includes the line paths 56 along which a heated spot 54 will traverse (in the case of the line heating method of FIG. 7A) or the line path of the heated line 60 (in the case of the heated line method of FIG. 7B), the amount of heat applied by each heating head 42, the number of passes of the heated spot 54 that will be made along each portion of the path of the line (in the case of the line heating method of FIG. 7A), and so forth. Generally, the planning systems for this process utilize data from computer aided design and computer aided manufacturing (CAD/CAM) systems, which may provide the control system 86 with the plans for execution, and which may also describe the shape of the part (e.g., a metal plate 14) that is to be formed.

In certain embodiments, a single heating head 42 (e.g., associated with a single induction coil, in certain embodiments) may be used to generate the heated line 60. In other words, in certain embodiments, a heating head 42 of an individual thermal forming assembly 88 may be shaped in such a way that an entire line of the material 14 may be simultaneously heated. It will be appreciated that, in such an embodiment, the power level of the applied energy will need to be increased as the length of the induction coil increases. In other embodiments, multiple induction coils may be used with individually lower power levels, but an aggregate high power level commensurate with the length of the line 60 and the metal alloy that is being formed. In such an embodiment where multiple induction coils are used, the thermal forming assemblies 88 associated with the multiple induction coils may be positioned by the control system 86 such that they are aligned appropriately with respect to the line 60.

In certain embodiments, the height of the induction coil may be controlled by the control system 86 using sensor feedback from the sensors 92 to guide the positioning. Because water cooling is generally used, as described below, in certain situations, the water may at least partially interfere with direct measurement using a laser height sensor 92 due to reflection of the laser light being misdirected by the water surface. In such embodiments, a mechanical device may be used to measure the height of the induction coil with respect to the surface 22 of the material 14. As described below, in certain embodiments, a circular air knife will be used. In such an embodiment, a laser height sensor 92 may be used to measure the height of the induction coil with respect to the surface 22 of the material 14 being thermally formed. The dry area created by the circular air knife minimizes the risk of erroneous measurements and provides a stable data feedback to the control system 86. In certain embodiments, an infrared temperature sensor 92 may also be used to control the power being delivered to the induction coil, such that a correct maximum temperature is maintained relatively uniform throughout the thermal forming process. In such an embodiment, the circular air knife keeps the spot under the induction coil dry and clean, such that the infrared sensor 92 does not generate erroneous data output due to water or debris on the surface 22 of the material being thermally formed.

In certain embodiments, multiple induction coils (e.g., associated with multiple thermal forming assemblies 88) may be used, and the height of each respective induction coil with respect to the surface 22 of the material 14 being thermally formed may be individually controlled by the control system 86. The use of multiple induction coils to from the heated line 60 provides the ability of the heated line forming system to have each of the induction coils at any given location (and relative height) with respect to the surface 22 of the material 14 being thermally formed, which makes accurate forming of the material 14 (even having an initial curved topography) possible. Multiple induction coils along the heated line 60 provides the automated thermal forming system 40 with the ability to change the shape of the surface topography of the heated line 60 as the shape of the material 14 changes during the thermal forming process.

Although described herein as primarily involving moving a heated spot 54 along a linear path 56 or using an entire heated line 60, in other embodiments, the pattern that the heated spots 54 are moved, or the pattern that the heated "line" forms, may not be a line at all, but rather may be any curvilinear pattern in any or all of the axes mentioned above. For example, in certain embodiments, a heated spot 54 may be moved in any curvilinear pattern in a direction parallel to the plane 30 of the heated material 14 and/or a direction perpendicular to this plane 30 (e.g., toward or away from the heated material 14 in the through-thickness direction 28 and/or along a length of the heated material 14). Similarly, the layout of a plurality of heating heads 42 may be such that instead of a heated line 60 that is moved by the system 40, a heated curvilinear pattern of heating heads 42 may be moved by the system 40. Such non-linear heating patterns may prove advantageous, for example, in pipe forming, I-beam forming, plate forming when a waved or other complex three-dimensional pattern is desired, and so forth. It is noted that such non-linear thermal forming techniques provide distinct advantages over conventional mechanical bending techniques, which may not even be capable of providing such complex three-dimensional bends.

As discussed above, the constraint of the cooler metal surrounding the heated metal contributes to the proper functioning of the thermal forming process. In order to maintain a relatively large thermal gradient needed to keep the surrounding metal from heating, the process is made more efficient and faster the colder the surrounding metal is. In certain embodiments, cooling may be accomplished by convection of heat from the metal surface, or by applying a spray of water on the surrounding metal. One drawback to this approach is that the water may intrude to the heated spot 54 or heated line 60, thereby reducing the amount of heat available, which reduces the rate of heating. In addition, if the water is not sprayed onto the metal surface, then a film of warm liquid forms on the metal surface, which reduces the cooling efficiency and, therefore, reduces the forming efficiency and, thus, the forming rate. However, spraying the water on the surface with sufficient force to continually remove the film of warm water adjacent to the surface, may cause water to splash onto the heated spot 54 or heated line 60.

One method of cooling is to combine a pressurized water spray onto the surface with an air knife which generates a barrier between the cooled metal surface and the heated metal surface, and prevents water from splashing onto the heated region. In the case of a heated spot 54, a circular air knife may be created around the heated spot 54. If the circular air knife is made in a frustoconical shape so that the narrower end of the frustoconical shape is closest to the metal surface, then the convergence of the air on the metal surface generates a region of elevated air pressure. The elevated air pressure causes the air to move away from the heated spot 54, preventing air turbulence from drawing some of the water into the heated area of the metal surface. Only a narrow range of cone angles may be used for the frustoconical shape of the circular air knife. If the cone angle is too large, then the flow of air from the air knife will overcome the slight pressure differential and water may be drawn from the plate surface to the heated area of the surface. If the cone angle is too small, then the air knife will not generate a sufficient increase in local pressure inside the circular air knife and the turbulence at the surface of the metal will draw water into the heated area of the surface. In certain embodiments, instead of an air knife, a physical barrier may be used, and which may not extend down to the surface 22 of the material 14 being thermally formed, but does act as a barrier to, for example, the escape of laser light reflected from the surface, when lasers are used as the heat sources 20.

Figure 8:
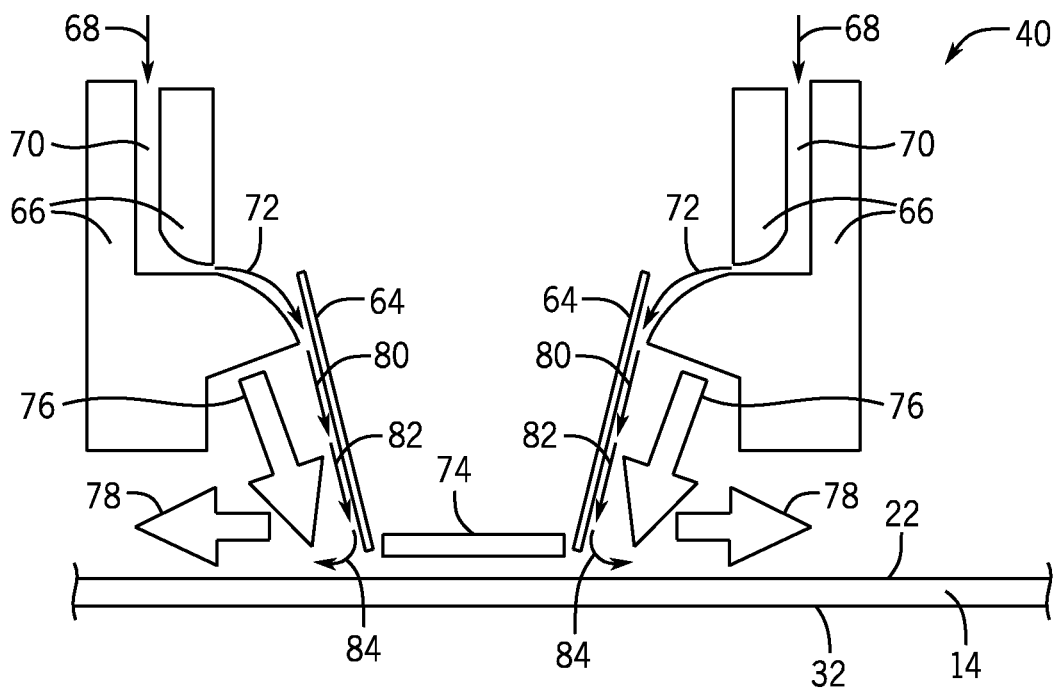
FIG. 8 is a cross-sectional side view of an exemplary thermal forming system in accordance with embodiments of the present disclosure.

The frustoconical circular air knife is generated by forming a frustoconical air guide with a smooth surface. FIG. 8 is a cross-sectional side view of an exemplary thermal forming system 40 in accordance with embodiments of the present disclosure. Surrounding the frustoconical air guide 64 is a circular air delivery device 66, which is constructed such that air 68 is delivered by an internal passage 70 that starts the air 68 on a downward path, then diverts the air flow radially inward toward the center of the frustoconical air guide 64, as illustrated by arrows 72. At the opening adjacent to the frustoconical air guide 64, the air delivery device passage 70 narrows and forms an air sheet which develops lamellar flow that conforms to a curved surface that the lamellar air sheet follows. The curvature of the surface ends at the same angle of flow as the corresponding frustoconical air guide 64 such that the lamellar sheet of flowing air 68 then transfers to, and follows, the surface of the frustoconical air guide 64 down to the surface 22 of the metal part 14 being formed. The frustoconical air guide 64 surrounds the heating coil 74 which is held adjacent to the metal part 14 being bent or formed, forming a heated area on the plate just below the coil 74. The water spray follows the path illustrated by arrows 76, 78 down to the metal part surface 22, then is directed away from the heated area on the metal part 14 by the air flow illustrated by arrows 80, 82, 84. It should be noted that, although described herein as using water, other coolant or cooling media (e.g., air, liquified gases such as liquid argon, solidified gases such as carbon dioxide, and so forth) may be used instead of water, especially to increase the cooling rate of metals that may be reactive to water.

For the situation of a heated line 60, not made up of multiple heated spots 54, but instead with a single continuous coil 74, the design may be similar to that illustrated in FIG. 8, except that the cross-section is of a long linear air knife, rather than a circular air knife. For example, the sides of the air guide 64 would be planar rather than frustoconical circular. Otherwise, the design would have a substantially similar cross-sectional profile.

In other embodiments, a plurality of thermal forming assemblies 88 with respective heating heads 42 (e.g., induction coils) may be used together and positioned appropriately along the heated line 60. In such an embodiment, the air guides 64 for the thermal forming assemblies 88 may, for example, include two substantially parallel walls 98 disposed on opposite sides of the respective heating head 42, and the control system 86 may position the thermal forming assemblies 88 such that the walls 98 of the thermal forming assemblies 88 generally align parallel with each other such that the air guides 64 of the thermal forming assemblies 88 provide the same functionality as a long linear air knife, as described above. FIG. 10 is a cutaway top view of such an embodiment.

Deformation in continuum mechanics is the transformation, through the use of a deformation process, of a body (e.g., a metal plate 14) from an initial shape to a required shape or configuration. A configuration is a set containing the positions of all particles of the body. Deformation may be caused by external loads, body forces (such as gravity or electromagnetic forces), changes in temperature, moisture content, or chemical reactions, etc., or by the generation of internal induced stresses, such as thermal stresses. Strain is a description of deformation in terms of relative displacement of particles in the body that excludes rigid-body motions. Different equivalent choices may be made for the expression of a strain field depending on whether it is defined with respect to the initial shape or the final shape of the body, and on whether the metric tensor or its dual is considered.

The plan executed by the control system 86 to thermally form the material 14 utilizes numerical analysis based on elastic-plastic theory to determine the thermal strains needed to form the material 14 as desired, then to create a heating/cooling process plan that will generate the necessary level of thermal strains at specific locations along the material 14. In certain embodiments, artificial neural networks may be utilized by the control system 86 to infer forming information that may be applied to new plates with multi-layer artificial neural network models derived from a product database that includes data obtained by numerical simulations and measurements from previously formed material 14. Then, the control system 86 may generate information on heating paths and heat conditions by calculating in-plane and bending strains from relationships between rigid plates and the desired curved plates, and from relationships between desired curved plates and plates partially formed in the middle of the thermal forming process. In general, the difference between any shaped plate partially formed in the middle of formation and the desired curved plates can be measured (e.g., using sensors, such as optical sensors, etc., in certain embodiments) during the thermal forming process, and the in-plane and bending strains can be numerically calculated based on that difference to provide the thermal forming information. The final formed shape may be completed by repeatedly (e.g., iteratively) making this measurement and calculation at each processing step.

Three main difficulties are addressed by the embodiments described herein. First, the numerical analysis programs of the control system 86 needed in order to execute at a level of detail with respect to internal stresses and consequent internal strains to produce accurately formed material 14 may require hours or even days to run. This could otherwise make such analysis prohibitively expensive to apply for one-of-a-kind or few-of-a-kind parts, which are quite common in many industries, but particularly in the production of large combat ships, for example, which may be produced in relatively small numbers compared to mass-produced cargo ships. Furthermore, such analysis may be particularly time-intensive when used in an iterative approach during the thermal forming process to calculate the next thermal forming step to be executed based on an intermediate shape compared to numerical analysis to the final required shape. Second, each lot of metal plate 14 from a large plate-producing facility, such as a steel mill, is different than any other lot of metal plate 14. For example, variations in chemical composition and in the exact temperature of the metal plate 14 when it is worked, such as hot rolling, produce variations in the elastic-plastic mechanical properties and behavior of the metal plate 14. Third, in order to accurately model the elastic-plastic mechanical behavior of the metal plate 14, the precise properties at multiple temperatures must be known with a significant level of precision. Few common metals used in heavy fabrication have had elevated temperature properties studied and archived and, as such, numerical models must rely on approximations and extrapolated properties. In addition, the very rapid heating and cooling rates used during thermal forming have been shown in studies to cause shifts in these elevated temperature properties. This inevitably could result in errors in the shape of the final component if not properly accounted for.

Figures 7A, 7B:
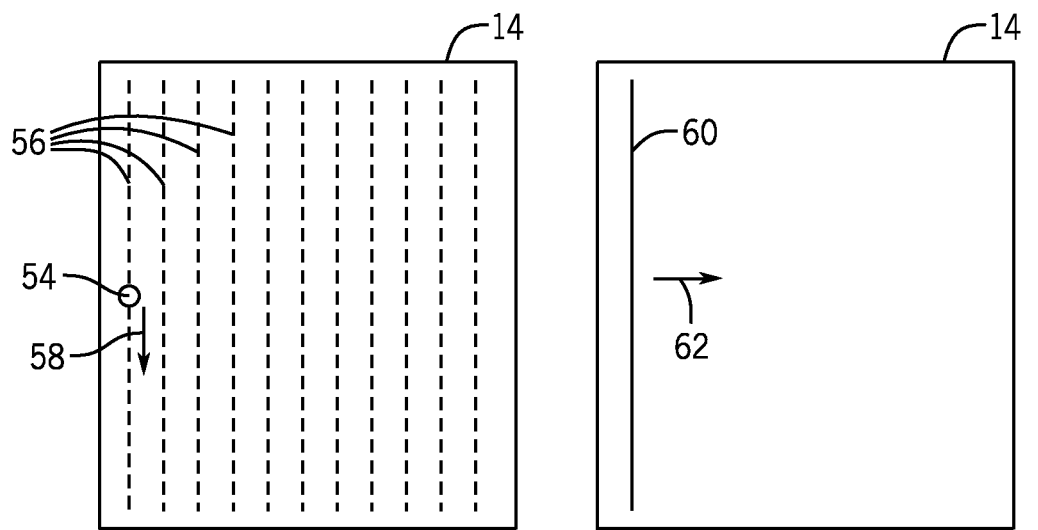
FIGS. 7A and 7B are top view of a line heating method versus a heated line method for metal bending or forming in accordance with embodiments of the present disclosure.

Certain embodiments described herein utilize a heated line 60 (FIG. 7B) instead of a heated spot 54 which moves along a line path 56 (FIG. 7A). The entire line 60 is heated using one induction coil, or multiple induction coils simultaneously. When using a heated spot 54 that traverses along a path 56, the material along the entire path 56 where the heated spot 54 is not located is not deforming and, in fact, is opposing the local bending that is occurring at the location of the heated spot 54. Conversely, when the entire line 60 is simultaneously formed, the amount of forming produces many times as much deformation, and much faster, than with the heated spot 54 traversing along a line path 56. The rate of forming has been shown experimentally to exceed 10 times as much with heated line 60 forming (FIG. 7B) compared to a heated spot 54 moving along a line path 56 (FIG. 7A). In certain embodiments, the control system 86 may not execute time-consuming numerical modeling of the elastic-plastic stress/strain generated inside the material 14 being thermally formed by the thermal forming process. Instead, in certain embodiments, the control system 86 may utilize the surface topography of the material 14 exclusively, and apply only an artificial neural network that models surface topography directly without any stress/strain analysis or calculation.

In certain embodiments, a fractional factorial experimental design is used to conduct a series of forming experiments on small metal pieces cut from the metal which is to be formed. The input parameters are the heating variables, for example, heating time, power utilized by the thermal forming assemblies 88, travel speed of the heated line 60; and the cooling variables, for example coolant temperature, coolant flow rate, cooling time. The output parameters are the surface topography measurement of the resulting shape of a test piece, for example, a test plate that is substantially similar (e.g., being made of substantially similar material, using substantially similar metallurgical processes, and/or having substantially similar physical dimensions, such as thickness, and so forth) to the plate being heated. The surface topography includes, for example, a detailed description or representation on a map of the test piece. The surface topography information can be obtained by surface measurement, for example a laser scanner, or by cross-sectioning and measurement by a commercial software called NAMeS™, which is a software measurement product. NAMeS is a software product for measuring the very complex geometry of cross-sections and generating a numerical data description of the measured shape. NAMeS produces the output data for the artificial neural network by measuring the surface profile of the cross-section of the formed experimental part by using a photograph of the part cross-section, or by measuring the shape of a scanned experimental part by using a photograph of a printed graph of the scan data of the surface profile of the part.

The fractional factorial experimental design can be generated by various methods, for example, A-Optimal, D-Optimal, Central Composite, Box-Benkens, Taguchi, or other methods. In certain embodiments, the control system 86 may automatically determine which method should be used based on a minimization of the number of experiments; thus, minimizing the cost and the time consumed.

In certain embodiments, the control system 86 utilizes a specialized artificial neural network topography called P/NA3 designed to create highly accurate models of shapes utilizing data from the NAMeS measurement software. In certain embodiments, the specific structure of a P/NA3 neural network cannot be described because the P/NA3 neural network training software of the control system 86 adds hidden nodes as needed during the training process. The addition of the hidden nodes may be partially controlled by an operator of the control system 86 that is running the training software, or by the software itself. Consequently, a P/NA3 neural network may not consist of internal hidden layers similar to a traditional multi-layer perceptron (MLP) type neural network, which is sometimes used for conventional planning of thermal forming processes, which use a heated spot 54 traversing a line path 56. As described herein, the P/NA3 neural network is used to model the shape of the heated line 60 formed experimental parts with the processing parameters of the heated line process as inputs.

It should be noted that, in contrast to the embodiments described herein, more traditional multi-layer perceptron neural networks, as described in one or more line-heating patents, start the neural network training process with random values for the weight factors, thus, it is similarly impossible to describe the specific weights, and based on the experience and perception of the operator who is running the training software, the number of hidden layers and/or hidden nodes in a multi-layer perceptron neural network are assigned and, thus, are not known or pre-determined and cannot be exactly described either.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A heated forming system comprising:
   a heating system configured to produce a heated region on a surface of a metal plate during a thermal forming process;
   a cooling system configured to direct a cooling medium around the heated region and maintain a dry area for the heated region by blocking the cooling medium from flowing onto the heated region during the thermal forming process, the cooling system comprising:
      an air knife comprising:
         an air guide, and
         an air delivery device configured to deliver air to the air guide, the air guide configured to guide the air around the heated region, the air forming a barrier that blocks the cooling medium from flowing onto the heated region; and
   a control system configured to control at least one operational parameter of the heated forming system to produce a desired shape of the metal plate.

2. The heated forming system of claim 1, wherein the heating system comprises a plurality of heating heads configured to produce a plurality of heated spots, wherein the control system is configured to align the plurality of heating heads to produce the heated region, the heated region comprising a linear alignment of the plurality of heated spots.

3. The heated forming system of claim 1, wherein the cooling system is configured to direct a cooling medium around the heated region via a spray mechanism that is positioned farther from a heating head of the heating system than the air guide.

4. The heated forming system of claim 3, wherein the at least one operational parameter includes one or more of an amount of cooling time the cooling system directs the cooling medium around the heated region, a temperature of the cooling medium as a function of time, a flow rate of the cooling medium as a function of time, an amount of heating time the heating system produces the heated region, an amount of power applied to the heating system to produce the heated region as a function of time, a positioning of the heated region as a function of time, or a travel speed of the heated region as a function of time.

5. The heated forming system of claim 1, wherein the air guide forms a perimeter around the heating head such that air output by the air delivery device is guided by the air guide around the heated region produced by the heating head, the air forming the barrier that blocks the cooling medium from flowing onto the heated region.

6. The heated forming system of claim 1, further comprising a height sensor configured to measure a height of the heating system above the surface of the metal plate, the dry area maintained by the cooling system minimizing a risk that the height measured by the height sensor is erroneous.

7. The heated forming system of claim 6, wherein the control system is configured to control the at least one operational parameter based on the height measured by the height sensor.

8. The heated forming system of claim 1, wherein the desired shape is consistent with a thermal forming plan that is created using an artificial neural network, the artificial neural network creating the thermal forming plan using heated region processing parameters and measured surface topography data, wherein the measured surface topography data is measured by experimentally forming a test plate that is substantially similar to the metal plate.

9. The heated forming system of claim 1, wherein the heated region is produced by simultaneous heating from a plurality of induction heating coils, the plurality of induction heating coils being independently positionable by the control system with respect to a support structure.

10. The heated forming system of claim 9, wherein the control system is configured to independently control at least one operating parameter of each of the plurality of induction heating coils based at least in part on operating data detected by one or more sensors of the heated line forming system, the at least one operating parameter comprising at least one of an amount of bending of the metal plate, a temperature generated by a respective induction heating coil, a distance of a respective induction heating coil from a surface of the metal plate, a travel speed of a respective induction heating coil with respect to the metal plate, a position of a respective induction heating coil with respect to the metal plate, or an inductive coupling between a respective induction heating coil and the metal plate.

11. A method comprising:
    producing a heated region on a surface of a metal plate during a thermal forming process;
    directing a cooling medium around the heated region during the thermal forming process;
    maintaining a dry area for the heated region during the thermal forming process by directing air around the heated region via an air guide of an air knife, the air forming a barrier that blocks the cooling medium from flowing onto the heated region;
    supporting the metal plate during the thermal forming process; and
    controlling at least one operational parameter to produce a desired shape of the metal plate.

12. The method of claim 11, further comprising aligning a plurality of heating head assemblies to form the heated region during the thermal forming process, the plurality of heating heads configured to produce a plurality of heated spots, and the heated region comprising a linear alignment of the plurality of heated spots.

13. The method of claim 11, wherein the heated region is produced via a heating head, and the cooling medium is directed around the heated region via a spray mechanism that is farther from a heating head than the air guide.

14. The method of claim 11, wherein the at least one operational parameter is controlled based on a height of a heating head assembly above the surface of the metal plate.

15. The method of claim 14, further comprising measuring the height of the heating head assembly above the surface of the metal plate via a height sensor, the dry area maintained for the heated region minimizing a risk that the height measured by the height sensor is erroneous.

16. The method of claim 11, further comprising creating a thermal forming plan using an artificial neural network, wherein the desired shape of the metal plate is consistent with the thermal forming plan, and the artificial neural network creates the thermal forming plan using heated region processing parameters and measured surface topography data, wherein the measured surface topography data is measured by experimentally forming a test plate that is substantially similar to the metal plate.

17. The method of claim 11, wherein directing air around the heated region further comprises outputting air from an air delivery device of the air knife to the air guide.

18. The method of claim 17, wherein the air guide comprises a frustoconical air guide.

19. The method of claim 18, wherein the air delivery device includes a curved surface having an angle of curvature that complements an angle of the frustoconical air guide such that air is smoothly guided from the air delivery device to the frustoconical air guide.

20. The method of claim 18, wherein the at least one operational parameter includes one or more of an amount of cooling time the cooling system directs the cooling medium around the heated region, a temperature of the cooling medium as a function of time, a flow rate of the cooling medium as a function of time, an amount of heating time the heating system produces the heated region, an amount of power applied to the heating system to produce the heated region as a function of time, positioning of the heated region as a function of time, or a travel speed of the heated region as a function of time.

* * * * *